(12) United States Patent
Namekawa et al.

(10) Patent No.: US 12,181,040 B2
(45) Date of Patent: Dec. 31, 2024

(54) CONTINUOUSLY VARIABLE TRANSMISSION

(71) Applicant: SUBARU CORPORATION, Tokyo (JP)

(72) Inventors: Shuichi Namekawa, Tokyo (JP); Susumu Ito, Tokyo (JP); Kensuke Kaneda, Tokyo (JP); Sayaka Mori, Tokyo (JP); Yasuyuki Miyake, Tokyo (JP); Masahiko Kurabayashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/370,216

(22) Filed: Sep. 19, 2023

(65) Prior Publication Data

US 2024/0011558 A1    Jan. 11, 2024

(51) Int. Cl.
*F16H 61/12*   (2010.01)
*F16H 7/06*    (2006.01)
*F16H 9/18*    (2006.01)

(52) U.S. Cl.
CPC .............. *F16H 61/12* (2013.01); *F16H 7/06* (2013.01); *F16H 9/18* (2013.01); *F16H 2061/122* (2013.01); *F16H 2061/1224* (2013.01)

(58) Field of Classification Search
CPC ............. F16H 37/021; F16H 2037/025; F16H 2037/023; F16H 2037/026; F16H 37/0846; F16H 37/084; F16H 37/0853

(Continued)

(56) References Cited

U.S. PATENT DOCUMENTS 3,203,277 A * 8/1965 General ............... F16H 47/065
                                                      475/52
4,630,504 A * 12/1986 Smirl .................. F16H 37/021
                                                      192/48.8

(Continued)

FOREIGN PATENT DOCUMENTS

JP      2006-250236 A      9/2006
JP      2008-121801 A      5/2008

(Continued)

*Primary Examiner* — Henry Y Liu
(74) *Attorney, Agent, or Firm* — MCGINN I.P. LAW GROUP, PLLC

(57) ABSTRACT

A continuously variable transmission includes a primary shaft, a secondary shaft, a primary pulley, a secondary pulley, a first power transmission member, a primary sprocket, a secondary sprocket, a second power transmission member, and a power transmission switch. The first power transmission member has a loop shape and is wrapped around the primary pulley and the secondary pulley. The primary sprocket is disposed on the primary shaft. The secondary sprocket is disposed on the secondary shaft. The second power transmission member has a loop shape and is wrapped around the primary sprocket and the secondary sprocket. The power transmission switch disables power transmission by the second power transmission member when the first power transmission member is in a normal condition and enables the power transmission by the second power transmission member when the first power transmission member is in an abnormal condition.

17 Claims, 7 Drawing Sheets

(58) Field of Classification Search
USPC .................................................... 474/8, 69
See application file for complete search history.

(56) References Cited

U.S. PATENT DOCUMENTS

| | | | | |
|---|---|---|---|---|
| 4,644,820 A * | 2/1987 | Macey | ............... | F16H 37/0846 475/211 |
| 4,740,191 A * | 4/1988 | Takano | ................ | F16H 37/021 474/69 |
| 4,864,889 A * | 9/1989 | Sakakibara | ......... | F16H 37/0846 475/219 |
| 5,024,638 A * | 6/1991 | Sakakibara | ......... | F16H 63/3043 475/210 |
| 5,031,481 A * | 7/1991 | Algrain | ............ | F16H 61/66259 477/44 |
| 5,167,591 A * | 12/1992 | Cowan | ................ | B62M 11/145 475/211 |
| 5,194,049 A * | 3/1993 | Knop, Jr. | .................. | F16H 9/26 474/18 |
| 5,669,846 A * | 9/1997 | Moroto | ............ | F16H 61/66259 477/45 |
| 5,788,600 A * | 8/1998 | Tsukamoto | ......... | F16H 37/0846 477/45 |
| 5,803,858 A * | 9/1998 | Haka | .................... | F16H 37/022 475/210 |
| 5,803,859 A * | 9/1998 | Haka | .................... | F16H 37/022 475/210 |
| 5,904,633 A * | 5/1999 | Lee | ....................... | F16H 37/021 475/210 |
| 5,916,053 A * | 6/1999 | McCarrick | ........... | F16H 37/022 474/119 |
| 5,931,760 A * | 8/1999 | Beim | ................ | F16H 37/0846 475/213 |
| 5,941,789 A * | 8/1999 | McCarrick | ........... | F16H 37/022 475/210 |
| 5,961,414 A * | 10/1999 | Beim | ................ | F16H 37/0846 475/218 |
| 5,961,418 A * | 10/1999 | Taniguchi | .............. | B60K 6/543 903/918 |
| 5,971,887 A * | 10/1999 | Hattori | ............. | F16H 61/66259 477/41 |
| 6,036,616 A * | 3/2000 | McCarrick | ........... | F16H 37/022 475/210 |
| 6,106,428 A * | 8/2000 | Koneda | ................ | F16H 37/022 475/210 |
| 6,146,308 A * | 11/2000 | Taniguchi | ............. | F16H 37/022 477/45 |
| 6,293,888 B1 * | 9/2001 | Moon | ................ | F16H 37/0846 475/210 |
| 7,246,672 B2 * | 7/2007 | Shirai | ................... | B60W 20/00 903/910 |
| 7,815,537 B2 * | 10/2010 | Triller | ................ | F16H 37/0846 475/210 |
| 7,824,308 B2 * | 11/2010 | Liu | ..................... | F16H 61/0403 477/109 |
| 8,235,848 B2 * | 8/2012 | Triller | ................ | F16H 57/0031 474/8 |
| 8,771,116 B2 * | 7/2014 | Triller | ................... | F16H 37/021 474/72 |
| 8,915,811 B2 * | 12/2014 | Horiike | ................ | F16H 37/021 474/8 |
| 9,540,012 B2 * | 1/2017 | Matsuo | ............... | B60W 30/188 |
| 9,546,720 B2 * | 1/2017 | Janson | ................ | F16H 37/022 |
| 9,625,018 B2 * | 4/2017 | Aoki | ................ | F16H 37/021 |
| 9,664,278 B2 * | 5/2017 | Toyoda | ................ | F16H 61/702 |
| 9,810,321 B2 * | 11/2017 | Nakamura | ............ | F16H 61/662 |
| 9,829,102 B2 * | 11/2017 | Fukao | ................ | B60R 16/0231 |
| 10,012,297 B2 * | 7/2018 | Fukao | .................... | F16H 61/12 |
| 10,066,746 B2 * | 9/2018 | Fukao | ............... | F16H 61/66272 |
| 10,138,986 B2 * | 11/2018 | Uchino | ................ | F16H 37/021 |
| 10,352,420 B2 * | 7/2019 | Hisada | ............ | F16H 37/0846 |
| 10,443,713 B2 * | 10/2019 | Washio | ................ | F16H 61/662 |
| 10,591,056 B2 * | 3/2020 | Washio | ............ | F16H 61/66272 |
| 10,626,985 B2 * | 4/2020 | Asai | ...................... | F16H 61/662 |
| 10,641,371 B2 * | 5/2020 | Cho | ................... | F16H 37/022 |
| 10,670,122 B2 * | 6/2020 | Okoshi | ................ | F16H 37/021 |
| 10,738,883 B2 * | 8/2020 | Suzumura | .......... | F16H 37/0846 |
| 10,753,471 B2 * | 8/2020 | Washio | ............... | F16H 37/0846 |
| 10,851,890 B2 * | 12/2020 | Hattori | ............... | F16H 37/0846 |
| 10,962,094 B2 * | 3/2021 | Cho | .................... | F16H 37/022 |
| 11,028,913 B2 * | 6/2021 | Six | .......... | F16H 48/10 |
| 11,204,084 B2 * | 12/2021 | Duan | .................... | F16H 37/021 |
| 2002/0094911 A1 * | 7/2002 | Haka | ................... | F16H 37/0846 477/211 |
| 2004/0077444 A1 * | 4/2004 | Kanda | .................. | F16H 37/021 474/8 |
| 2004/0185973 A1 * | 9/2004 | Sato | ....................... | F16H 37/021 474/8 |
| 2009/0017959 A1 * | 1/2009 | Triller | ................. | F16H 37/0846 475/216 |
| 2011/0124450 A1 * | 5/2011 | Yang | ..................... | F16H 37/021 474/69 |
| 2011/0244998 A1 * | 10/2011 | Triller | ................ | F16H 57/0031 474/8 |
| 2016/0053872 A1 * | 2/2016 | Van Rooij | ................ | F16H 9/18 474/8 |
| 2016/0076625 A1 * | 3/2016 | Guiroult | ............... | F16H 63/067 474/8 |
| 2016/0102741 A1 * | 4/2016 | Uchino | ................. | F16H 37/021 474/8 |
| 2016/0109000 A1 * | 4/2016 | Uchino | ................. | F16H 37/021 474/8 |
| 2016/0121896 A1 * | 5/2016 | Matsuo | ................ | B60W 10/02 701/53 |
| 2016/0123448 A1 * | 5/2016 | Samie | ................... | F16H 37/021 74/665 L |
| 2016/0131256 A1 * | 5/2016 | Toyoda | ............... | F16H 37/0846 701/51 |
| 2016/0186846 A1 * | 6/2016 | Kidokoro | .............. | F16H 37/022 474/8 |
| 2016/0305522 A1 * | 10/2016 | Fukao | .................... | B60K 17/16 |
| 2017/0159814 A1 * | 6/2017 | Fukao | ................ | F16H 61/6272 |
| 2017/0234415 A1 * | 8/2017 | Hisada | ................... | F16H 61/70 475/201 |
| 2017/0343090 A1 * | 11/2017 | Uchino | ................. | F16H 37/021 |
| 2018/0180174 A1 * | 6/2018 | Washio | ................ | F16H 61/662 |
| 2018/0180180 A1 * | 6/2018 | Moritomo | ............... | F16H 61/66 |
| 2018/0274643 A1 * | 9/2018 | Okoshi | ................ | F16H 37/021 |
| 2018/0274644 A1 * | 9/2018 | Sugiura | ............... | F16H 9/18 |
| 2018/0313444 A1 * | 11/2018 | Asai | ........................ | F16H 61/08 |
| 2019/0061767 A1 * | 2/2019 | Terada | ................ | F16H 37/022 |
| 2019/0128415 A1 * | 5/2019 | Washio | ............. | F16H 61/66272 |
| 2019/0211909 A1 * | 7/2019 | Six | .......................... | F16H 48/36 |
| 2019/0234515 A1 * | 8/2019 | Washio | ............... | F16H 37/0846 |
| 2019/0293173 A1 * | 9/2019 | Suzumura | .......... | F16H 37/0846 |
| 2019/0316674 A1 * | 10/2019 | Hattori | ................ | F16H 61/662 |
| 2020/0072330 A1 * | 3/2020 | Cho | ................... | F16H 37/022 |
| 2020/0114914 A1 * | 4/2020 | Kawai | ................... | B60W 30/19 |
| 2020/0124172 A1 * | 4/2020 | Nitani | ..................... | F16D 21/00 |
| 2020/0248783 A1 * | 8/2020 | Ohgata | ................. | F16H 37/022 |
| 2020/0263771 A1 * | 8/2020 | Cho | ................... | F16H 37/022 |
| 2020/0378494 A1 * | 12/2020 | Nitani | ............... | F16H 61/0206 |
| 2021/0180667 A1 * | 6/2021 | Duan | .................... | F16H 37/021 |
| 2021/0207694 A1 * | 7/2021 | Sørensen | ............ | F16H 37/0846 |

FOREIGN PATENT DOCUMENTS

| | | |
|---|---|---|
| JP | 2009-174553 A | 8/2009 |
| JP | 2016-125570 A | 7/2016 |

* cited by examiner

CONTINUOUSLY VARIABLE TRANSMISSION

CROSS-REFERENCE TO RELATED APPLICATIONS

The present application claims priority from Japanese Patent Application No. 2022-157606 filed on Sep. 30, 2022, the entire contents of which are hereby incorporated by reference.

BACKGROUND

The disclosure relates to a continuously variable transmission to be mounted on a vehicle.

Japanese Unexamined Patent Application Publication (JP-A) No. 2006-250236 discloses an example of a technique related to a continuously variable transmission (CVT) to be mounted on a vehicle such as an automobile. The technique includes an abnormality detection device for a chain V-pulley continuously variable transmission that makes it possible to predict a breakage of a power transmission chain. The abnormality detection device includes acoustic emission (AE) sensors and transmitters. The power transmission chain is wrapped around pulleys of the chain V-pulley continuously variable transmission. The AE sensors and the transmitters are mounted on the respective pulleys. Each of the AE sensors detects an elastic wave, and the corresponding transmitter wirelessly transmits a detection signal of the AE sensor by electromagnetic induction. Additionally, a discriminator is provided on a vehicle. The discriminator determines whether the elastic wave has reached an abnormal level, based on the signal wirelessly transmitted from the transmitter.

JP-A No. 2008-121801 discloses a belt continuously variable transmission including a primary pulley and a secondary pulley around which multiple belts are wrapped on an inner circumferential side and an outer circumferential side to increase a torque capacity and allow the belt continuously variable transmission to operate quietly without increasing a dimension in an axial direction.

JP-A No. 2009-174553 discloses a continuously variable transmission that has a reduced length in an axial direction to be compact and easily mountable on a vehicle. The continuously variable transmission includes two continuously variable wrap-around transmission mechanisms located parallel to each other back to back. An output component outputted from one of the continuously variable wrap-around transmission mechanisms is inputted to a planetary gear of a planetary gear mechanism. An output component outputted from the other one of the continuously variable wrap-around transmission mechanisms is inputted to a ring gear of the planetary gear mechanism. An output component from the planetary gear mechanism is transmitted to an output shaft through a sun gear.

To allow a vehicle to travel even if an abnormality occurs in which it is difficult to transmit power to a belt continuously variable transmission mechanism, JP-A No. 2016-125570 discloses, if an abnormality such as a belt breakage occurs in a continuously variable transmission mechanism of a continuously variable power split transmission mechanism, reducing an opening degree of a throttle valve of an engine to be equal to or less than a predetermined value and fixing a power transmission mode of the continuously variable power split transmission mechanism to a gear mode. This causes power input to an input shaft of the transmission to be output from a power combining gear mechanism via a constant transmission mechanism.

SUMMARY

An aspect of the disclosure provides a continuously variable transmission including a primary shaft, a secondary shaft, a primary pulley, a secondary pulley, a first power transmission member, a primary sprocket, a secondary sprocket, a second power transmission member, and a power transmission switch. The secondary shaft is disposed parallel to the primary shaft. The primary pulley is disposed on the primary shaft. The secondary pulley is disposed on the secondary shaft. The first power transmission member has a loop shape and is wrapped around the primary pulley and the secondary pulley. The primary sprocket is disposed on the primary shaft. The secondary sprocket is disposed on the secondary shaft. The second power transmission member has a loop shape and is wrapped around the primary sprocket and the secondary sprocket. The power transmission switch is configured to disable power transmission by the second power transmission member when the first power transmission member is in a normal condition and to enable the power transmission by the second power transmission member when the first power transmission member is in an abnormal condition.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
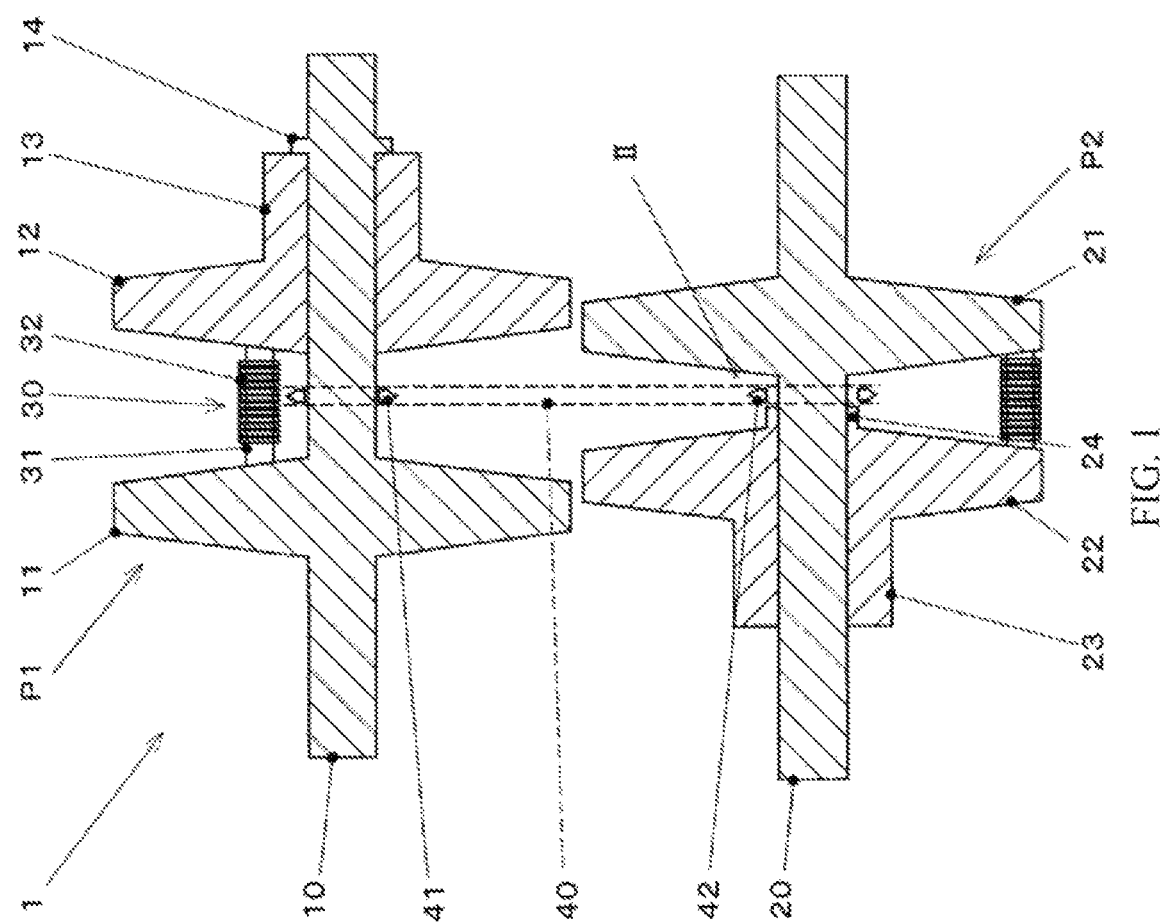
FIG. 1 is a diagram illustrating a configuration of a variator of a continuously variable transmission according to one example embodiment of the disclosure, indicating a state in which a main chain is in a normal condition and the variator has a maximum reduction ratio.

In an event such as a breakage in a power transmission member such as a chain or a belt, it becomes difficult for a typical continuously variable transmission to transmit power, making it difficult to drive a vehicle.

Given the circumstances, there is a demand for ensuring a limp-home performance of a vehicle that allows the vehicle to travel to a predetermined safe place or a service location where it is possible to repair the vehicle even if an abnormality occurs in the power transmission member.

It is desirable to provide a continuously variable transmission that allows a vehicle to travel even if an abnormality occurs in a power transmission member.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having distinguish substantially the same function and configuration are denoted with the same reference numerals to avoid any redundant description. In addition, elements that are not directly related to any embodiment of the disclosure are unillustrated in the drawings.

First Example Embodiment

In the following, a description is given of a continuously variable transmission according to a first example embodiment of the disclosure.

The continuously variable transmission according to the first example embodiment may include, for example, a chain continuously variable transmission to be mounted on a vehicle, for example, an automobile such as a passenger car. The vehicle may include an engine as a travel power source. The engine may be an internal combustion engine.

FIG. 1 is a diagram illustrating a configuration of a variator (transmission mechanism) 1 of a continuously variable transmission according to the first example embodiment, indicating a state in which a main chain 30 is in a normal condition and the variator 1 has a maximum reduction ratio.

The variator 1 may include, for example, a primary shaft 10, a secondary shaft 20, and the main chain 30.

The primary shaft 10 and the secondary shaft 20 may be a pair of rotating shafts located adjacent to each other so that central axes of rotation are parallel to each other.

The primary shaft 10 may be an input shaft of the variator 1. An output of the travel power source such as an engine may be inputted to the primary shaft 10 through, for example, a torque converter or a forward/reverse switch, which are not illustrated.

The torque converter may be a starting device that makes it possible for the vehicle to start moving from a stopped state.

The torque converter may be provided with a lock-up clutch. The lock-up clutch may restrict differential rotation between an input side and an output side in response to an instruction from a non-illustrated transmission control unit.

The forward/reverse switch may include, for example, a planetary gear set. When a reverse range is selected, the planetary gear set may reverse rotation of an output part of the torque converter and transmit the reversed rotation to the primary shaft 10.

The primary shaft 10 may be provided with, for example, a fixed sheave 11, a movable sheave 12, a cylindrical part 13, and a stopper 14.

Each of the fixed sheave 11 and the movable sheave 12 may be a disk-shaped part that protrudes radially outward from the primary shaft 10 to form a flange. In one embodiment, the fixed sheave 11 and the movable sheave 12 may serve as a "pair of sheaves".

The fixed sheave 11 may be secured to the primary shaft 10.

The fixed sheave 11 and the primary shaft 10 may be provided as a one-piece member, for example.

The movable sheave 12 may be movable relative to the primary shaft 10 in the direction of the central axis of rotation.

The movable sheave 12 may be restricted not to rotate relative to the primary shaft 10 about the central axis of rotation.

The fixed sheave 11 and the movable sheave 12 may configure a primary pulley P1.

The fixed sheave 11 and the movable sheave 12 may be tapered on sides opposed to each other so that a pulley groove width of the primary pulley P1 continuously increases from a radially inner side to a radially outer side.

The tapered sides may be brought into contact with end faces of pins 31 of the main chain 30, which will be described later.

The cylindrical part 13 may protrude from a central part of the movable sheave 12 on a side facing away from the fixed sheave 11 in an axial direction of the primary shaft 10.

The cylindrical part 13 and the movable sheave 12 may be provided as a one-piece member, for example.

Part of the primary shaft 10 may be disposed on a radially inner side of the cylindrical part 13.

The cylindrical part 13 may move relative to the primary shaft 10 together with the movable sheave 12 in the direction of the central axis of rotation.

The stopper 14 may limit a stroke of the movable sheave 12 in a direction separating from the fixed sheave 11, that is, in a direction in which the pulley groove width of the primary pulley P1 is increased.

The stopper 14 may protrude from an outer circumferential surface of the primary shaft 10 in a radial direction of the primary shaft 10. The stopper 14 may be brought into contact with an end face of the cylindrical part 13 when the movable sheave 12 separates from the fixed sheave 11 by a predetermined amount. In this manner, the stopper 14 may limit further movement of the movable sheave 12.

A stroke end of the movable sheave 12 limited by the stopper 14 may be set in such a manner that a reduction in an effective diameter of the primary pulley P1 does not cause the main chain 30 to interfere with a later-described sub chain 40.

The secondary shaft 20 may be an output shaft of the variator 1. An output of, for example, the engine that is inputted to the primary shaft 10 may be transmitted to the secondary shaft 20 through a member such as the main chain 30.

An output of the secondary shaft 20 may be transmitted to a non-illustrated front-wheel drive mechanism, a non-illustrated rear-wheel drive mechanism, or both directly or through a non-illustrated all-wheel drive (AWD) transfer.

The secondary shaft 20 may be provided with, for example, a fixed sheave 21, a movable sheave 22, a cylindrical part 23, and an engaging part 24.

Each of the fixed sheave 21 and the movable sheave 22 may be a disk-shaped part that protrudes radially outward from the secondary shaft 20 to form a flange. In one embodiment, the fixed sheave 21 and the movable sheave 22 may serve as the "pair of sheaves".

The fixed sheave 21 and the movable sheave 22 of the secondary shaft 20 may be located in an order reverse of the order in which the fixed sheave 11 and the movable sheave 12 of the primary shaft 10 are located.

The fixed sheave 21 may be secured to the secondary shaft 20.

The fixed sheave 21 and the secondary shaft 20 may be provided as a one-piece member, for example.

The movable sheave 22 may be movable relative to the secondary shaft 20 in the direction of the central axis of rotation.

The movable sheave 22 may be restricted not to rotate relative to the secondary shaft 20 about the central axis of rotation.

The fixed sheave 21 and the movable sheave 22 may configure a secondary pulley P2.

The fixed sheave 21 and the movable sheave 22 may be tapered on sides opposed to each other so that a pulley groove width of the secondary pulley P2 continuously increases from a radially inner side to a radially outer side.

The tapered sides may be brought into contact with end faces of the pins 31 of the main chain 30, which will be described later.

The cylindrical part 23 may protrude from a central part of the movable sheave 22 on a side facing away from the fixed sheave 21 in an axial direction of the secondary shaft 20.

The cylindrical part 23 and the movable sheave 22 may be provided as a one-piece member, for example.

Part of the secondary shaft 20 may be disposed on a radially inner side of the cylindrical part 23.

The cylindrical part 23 may move relative to the secondary shaft 20 together with the movable sheave 22 in the direction of the central axis of rotation.

The engaging part 24 may include, for example, a protrusion. The protrusion may protrude from the central part of the movable sheave 22 on a side facing toward the fixed sheave 21 in the axial direction of the secondary shaft 20.

The engaging part 24 may be located separate from a secondary sprocket 42 during normal use of the vehicle. The engaging part 24 may move toward the fixed sheave 21 together with the movable sheave 22 in an event such as dropping off of the main chain 30 to be engaged with the secondary sprocket 42.

The main chain 30 is a power transmission member having a loop shape and wrapped around the primary pulley P1 and the secondary pulley P2. In one embodiment, the main chain 30 may serve as a "first power transmission member".

The main chain 30 may include the pins 31 disposed in a circumferential direction of the main chain 30 and plates 32 each coupling adjacent pins 31.

The pins 31 may be shaft-shaped members located parallel to central axes of rotation of the primary shaft 10 and the secondary shaft 20.

Both ends of the pins 31 may be held by tapered surfaces of the sheaves of the primary pulley P1 and the secondary pulley P2.

The plates 32 may be planar members located along a plane orthogonal to a longitudinal direction of the pins 31.

Multiple plates 32 may be located in an axial direction of the pins 31 and in the circumferential direction of the main chain 30.

Each plate 32 may receive a pair of pins 31 located adjacent to each other on both ends of the plate 32. The pins 31 may each be rotatable about its axis.

With the configuration described above, the main chain 30 may be bendable around each pin 31. This makes it possible for the main chain 30 to deform by a curvature corresponding to an effective diameter of each pulley.

The variator 1 of the first example embodiment may further include the sub chain 40, a primary sprocket 41, and the secondary sprocket 42.

The sub chain 40 is, for example, a power transmission member that has a loop shape. The sub chain 40 may include a member such as a roller chain. In one embodiment, the sub chain 40 may serve as a "second power transmission member".

The sub chain 40 may be located on an inner circumferential side of the main chain 30 and at a position overlapped with the main chain 30 that is in a normal condition in the axial direction of the pins 31.

The sub chain 40 is wrapped around the primary sprocket 41 and the secondary sprocket 42.

The primary sprocket 41 may be located radially outward of the primary shaft 10 and between the fixed sheave 11 and the movable sheave 12.

The primary sprocket 41 may be secured to the primary shaft 10 by, for example, a spline and a circlip. Alternatively, the primary sprocket 41 and the primary shaft 10 may be provided as a one-piece member.

The secondary sprocket 42 may be located radially outward of the secondary shaft 20 and between the fixed sheave 21 and the movable sheave 22.

Figure 2:
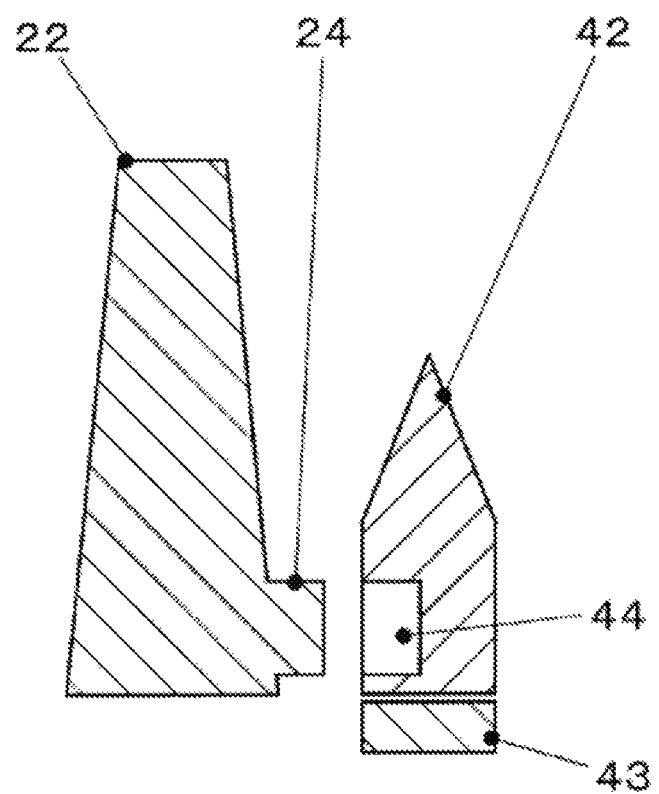
FIG. 2 is an enlarged schematic diagram illustrating part II in FIG. 1.

FIG. 2 is an enlarged schematic diagram illustrating part II in FIG. 1.

When the main chain 30 is in a normal condition, the secondary sprocket 42 may be rotatable about the shaft with respect to the secondary shaft 20 with a bearing such as a plain bearing 43 interposed between the secondary sprocket 42 and the secondary shaft 20. That is, the secondary sprocket 42 may be idle with respect to the secondary shaft 20.

Alignment of the secondary sprocket 42 may be adjusted using, for example, a non-illustrated shim.

The secondary sprocket 42 may include a receiving part 44. The receiving part 44 may engage with the engaging part 24 of the movable sheave 22 when the main chain 30 is brought into an abnormal condition such as a breakage of the main chain 30.

The engaging part 24 and the receiving part 44 may respectively be, for example, a dowel (projection) and a hole (recess) that receives the dowel so that the dowel and the hole are fitted to each other.

Note that the engaging part and the receiving part are not limited to the configuration described above and may be changed as appropriate.

According to the variator 1 of the first example embodiment, in response to an instruction from the non-illustrated transmission control unit, a sheave spacing (the pulley groove width) of the primary pulley P1 and a sheave spacing (the pulley groove width) of the secondary pulley P2 may each be varied by, for example, hydraulic control. This may change an effective diameter (wrap diameter) of each of the primary pulley P1 and the secondary pulley P2 around which the main chain 30 is wrapped, thereby achieving shifting.

The narrower the sheave spacing of each pulley, the larger the effective diameter may become, and the wider the sheave spacing of each pulley, the smaller the effective diameter may become.

The transmission control unit may set a target shifting ratio in accordance with, for example, a traveling state of the vehicle and may control the sheave spacing of each pulley so that an actual shifting ratio of the variator 1 matches with the target shifting ratio.

Figure 3:
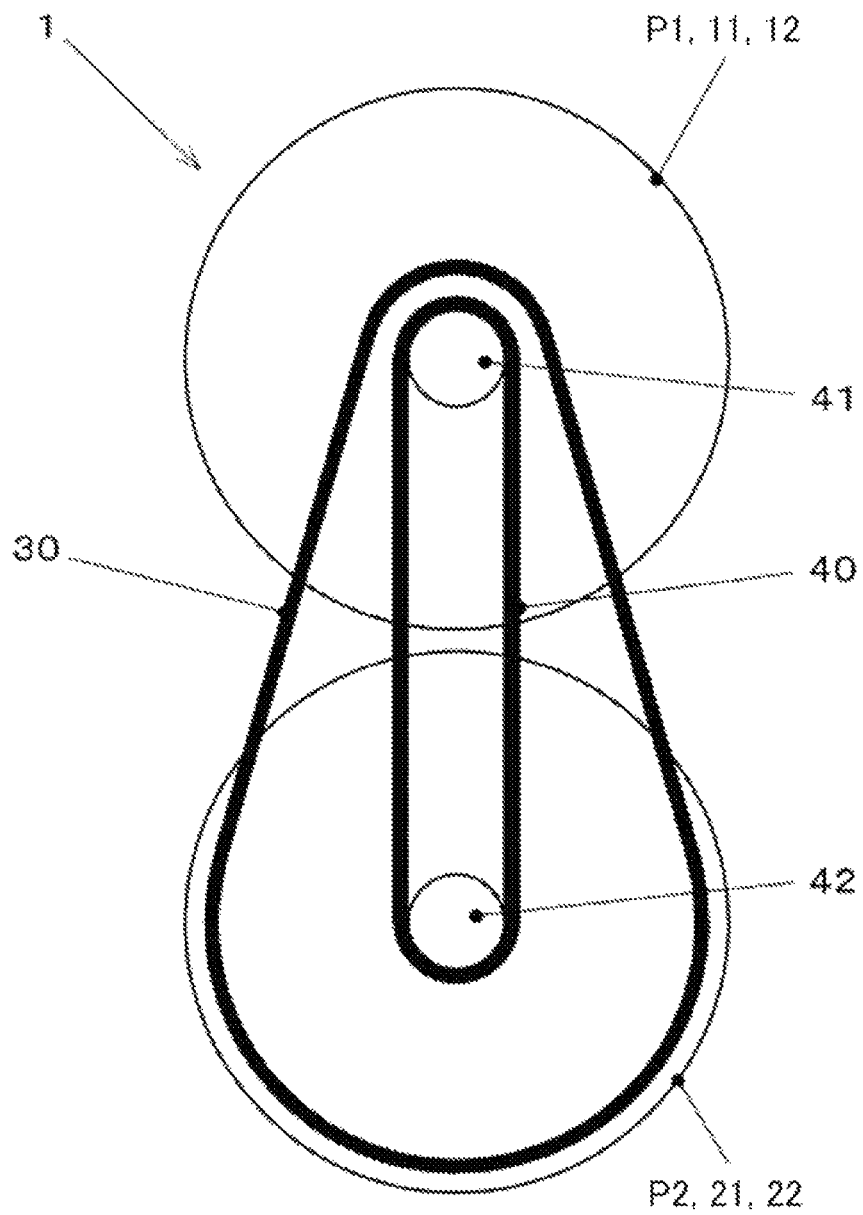
FIG. 3 is a diagram illustrating a state of the main chain and a sub chain when the variator of FIG. 1 is viewed from an axial direction and has the maximum reduction ratio.

FIG. 3 is a diagram illustrating a state of the main chain 30 and the sub chain 40 when the variator 1 of the first example embodiment is viewed from an axial direction and has the maximum reduction ratio.

In a state of the maximum reduction ratio illustrated in FIGS. 1 and 3, the effective diameter of the primary pulley P1 may be minimum, and the effective diameter of the secondary pulley P2 may be maximum in the normal use of the vehicle, e.g., when the main chain 30 is in a normal condition.

At this time, part of the sub chain 40 wrapped around the primary sprocket 41 may be located on the inner circumferential side of the main chain 30 spaced apart from the main chain 30 in a radial direction of the primary sprocket 41.

Figure 4:
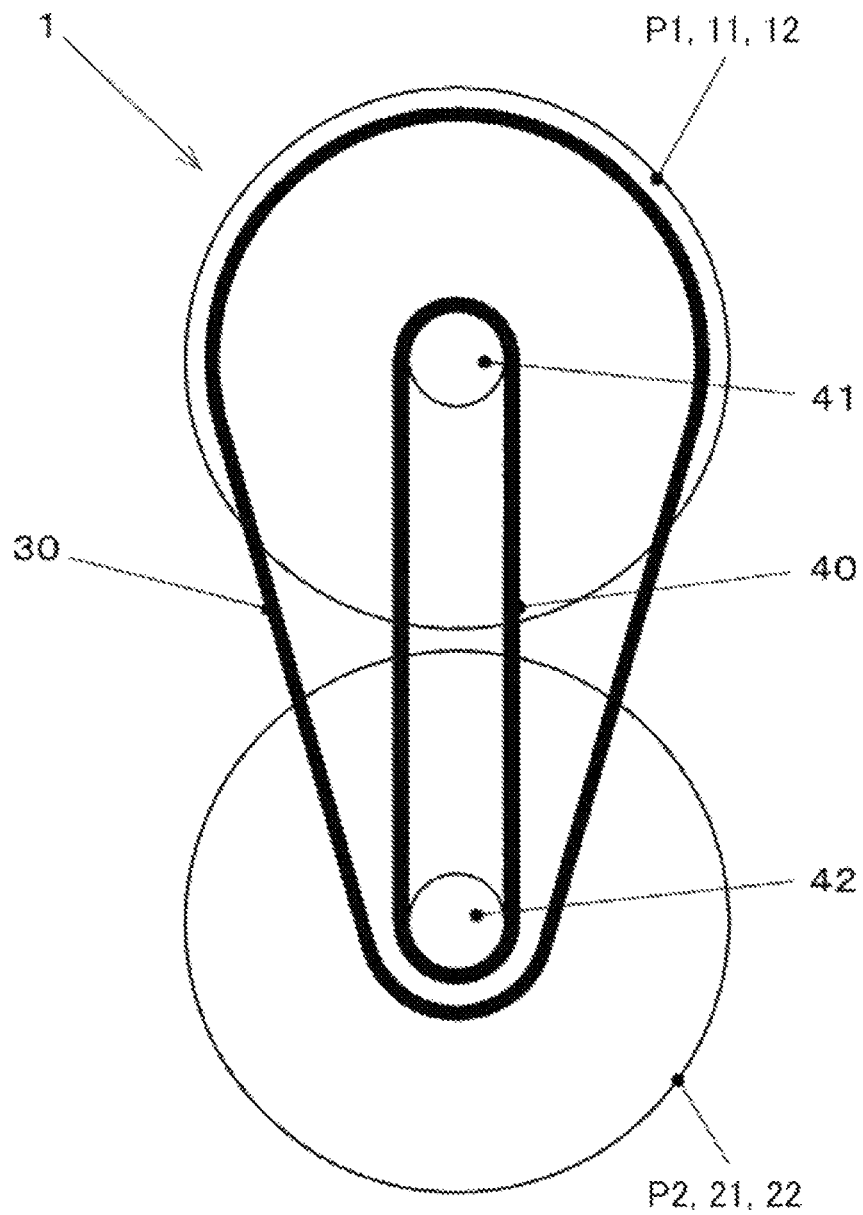
FIG. 4 is a diagram illustrating a state of the main chain and the sub chain when the variator of FIG. 1 is viewed from the axial direction and has a minimum reduction ratio, or a speed increased state.

FIG. 4 is a diagram illustrating a state of the main chain 30 and the sub chain 40 when the variator 1 of the first example embodiment is viewed from the axial direction and has a minimum reduction ratio, or a speed increased state.

In a state of the minimum reduction ratio illustrated in FIG. 4, the effective diameter of the primary pulley P1 may be maximum, and the effective diameter of the secondary pulley P2 may be minimum.

At this time, part of the sub chain 40 wrapped around the secondary sprocket 42 may be located on the inner circumferential side of the main chain 30 spaced apart from the main chain 30 in a radial direction of the secondary sprocket 42.

When an abnormality such as a breakage or dropping off of the main chain 30 occurs, the variator 1 of the first example embodiment may transmit power from the primary shaft 10 to the secondary shaft 20 through the sub chain 40.

Upon breakage, the main chain 30 may be disengaged from the primary pulley P1 and the secondary pulley P2 by centrifugal force, hit an inner surface of a non-illustrated transmission case, and drop to a bottom part of the transmission case.

Figure 5:
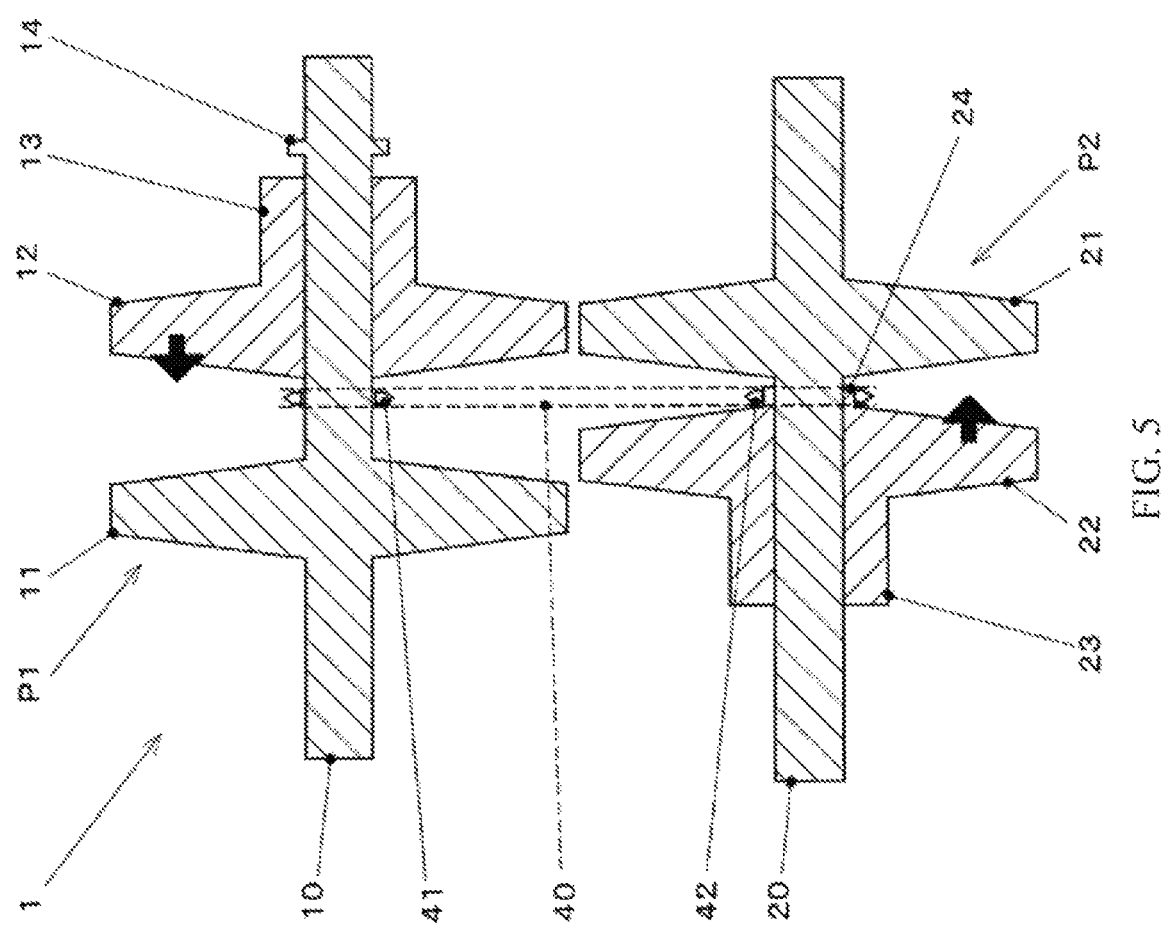
FIG. 5 is a diagram illustrating a configuration of the variator of FIG. 1 in a state in which the main chain is broken.

FIG. 5 is a diagram illustrating a configuration of the variator 1 of the first example embodiment in a state in which the main chain 30 is broken.

Figure 6:
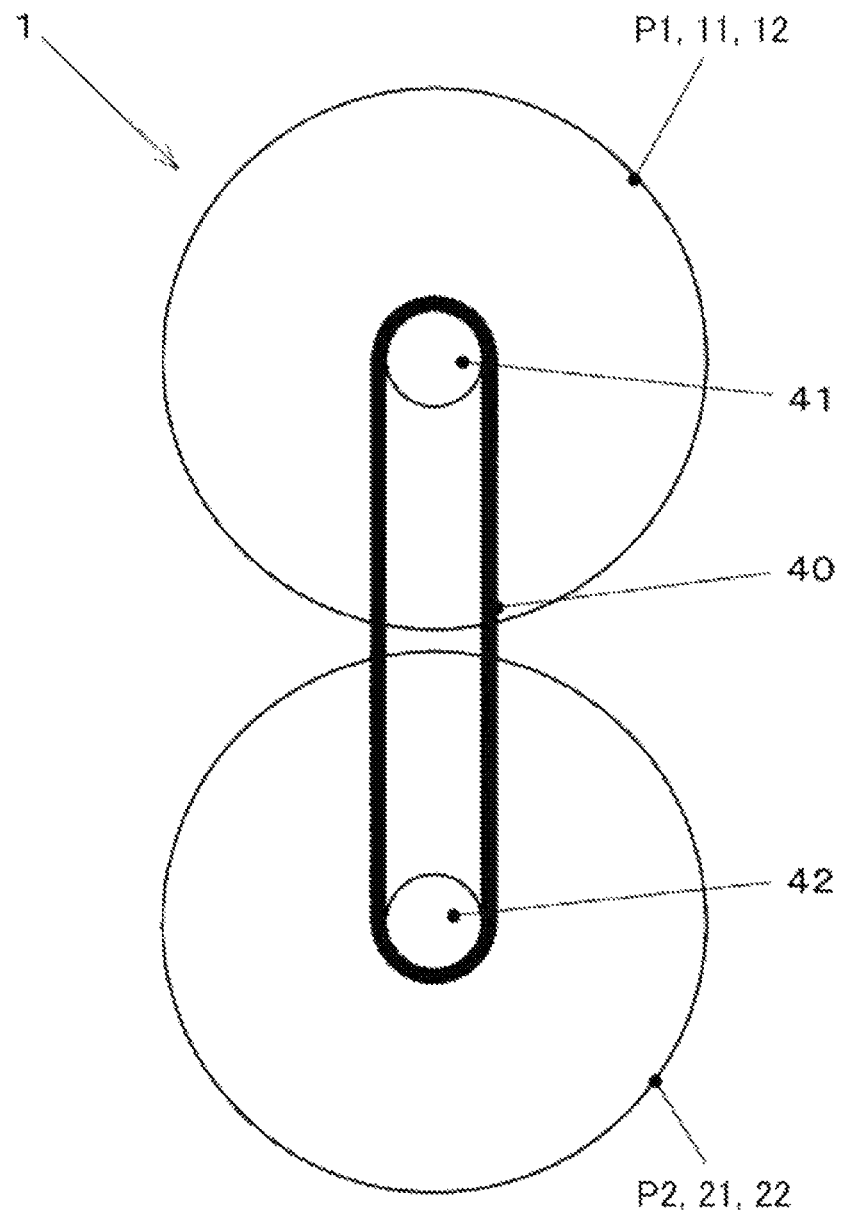
FIG. 6 is a diagram illustrating a state of the sub chain when the variator of FIG. 1 is viewed from the axial direction in a state in which the main chain is broken.

FIG. 6 is a diagram illustrating a state of the sub chain 40 when the variator 1 of the first example embodiment is viewed from the axial direction in a state in which the main chain 30 is broken.

For example, when an abnormality in the main chain 30 is detected in accordance with rotating speeds of the primary shaft 10 and the secondary shaft 20, such as when dropping off of the main chain 30 due to breakage is detected, the transmission control unit may further reduce the sheave spacing of the secondary pulley P2, or cause overstroke, so that the sheave spacing of the secondary pulley P2 becomes smaller than a minimum sheave spacing that may be taken during normal use of the vehicle.

This may cause the engaging part 24 on the movable sheave 22 to be engaged with the receiving part 44 of the secondary sprocket 42. This may lock the secondary sprocket 42 so that the secondary sprocket 42 does not rotate relative to the secondary shaft 20.

When the secondary sprocket 42 is locked, driving of the secondary shaft 20 using the sub chain 40 may be started. This makes it possible to allow the vehicle to travel.

When the engaging part 24 is not engaged with the receiving part 44, e.g., when the main chain 30 is in a normal condition, the power transmission through the sub chain 40 may be disabled.

The engaging part 24 and the receiving part 44 may operate together to serve as a "power transmission switch" in one embodiment.

According to the first example embodiment described above, it is possible to achieve at least one of the following example effects.

(1) Even if an abnormality occurs in the main chain 30, it is possible to transmit power from the primary shaft 10 to the secondary shaft 20 through the sub chain 40. This helps to allow the vehicle to travel.

When the main chain 30 is in a normal condition, power transmission through the sub chain 40 is disabled. This helps to reduce an influence on, for example, shifting during normal traveling.

(2) The sub chain 40 may be located on the inner circumferential side of the main chain 30. This helps to provide the sub chain 40 without enlarging the outside shape of the variator 1.

(3) Power transmission through the sub chain 40 may be enabled by the engagement of the engaging part 24 with the receiving part 44 upon overstroke of the movable sheave 22. This helps to prevent validating the power transmission through the sub chain 40 when the main chain 30 is in a normal condition.

Second Example Embodiment

In the following, a description is given of a continuously variable transmission according to a second example embodiment of the disclosure.

In the second example embodiment, components similar to those in the first example embodiment described above are denoted with the same reference numerals to omit the description thereof, and differences will mainly be described.

Figure 7:
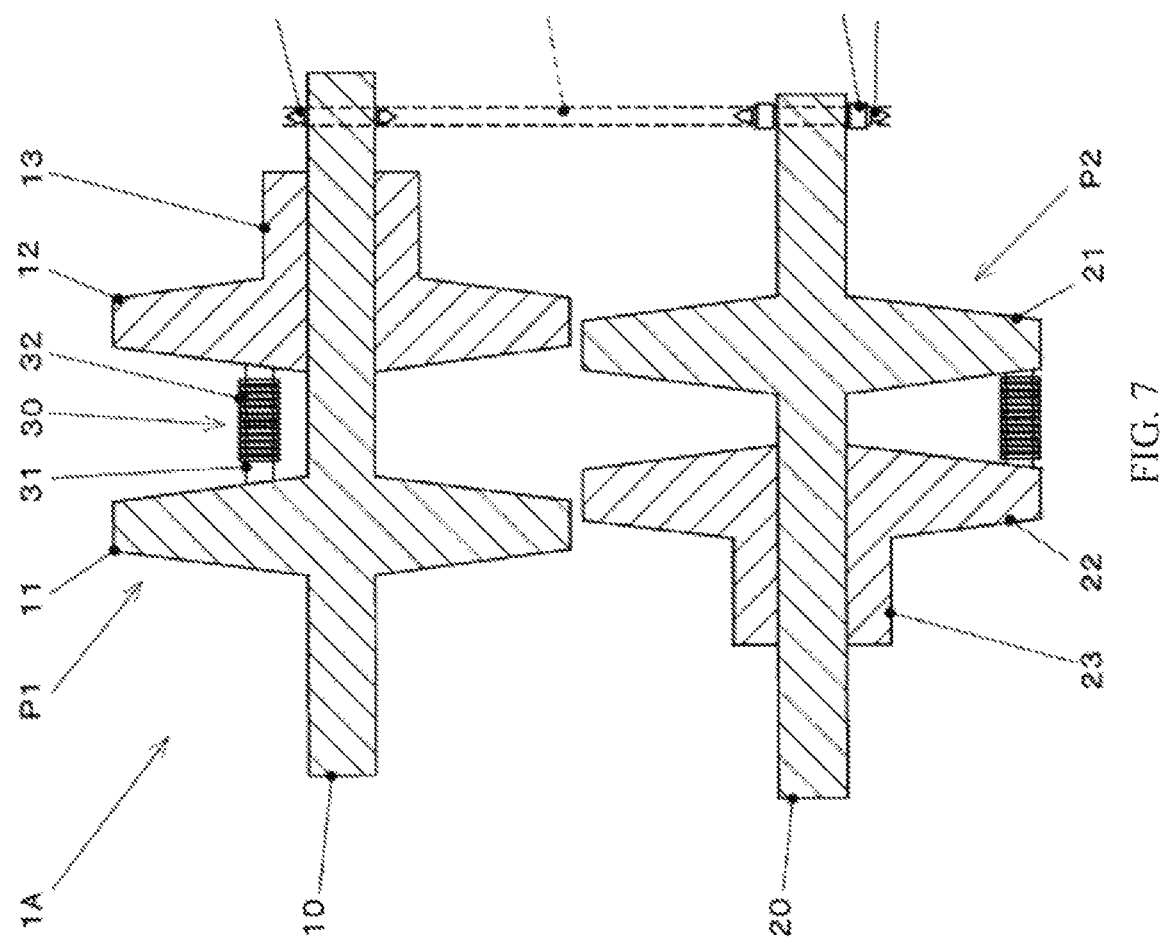
FIG. 7 is a diagram illustrating a configuration of a variator of a continuously variable transmission according to one example embodiment of the disclosure, indicating a state in which a main chain is in a normal condition and the variator has a maximum reduction ratio.

FIG. 7 is a diagram illustrating a configuration of a variator (transmission mechanism) 1A of the continuously variable transmission according to the second example embodiment, indicating a state in which the main chain 30 is in a normal condition and the variator 1A has a maximum reduction ratio.

Instead of the sub chain 40, the primary sprocket 41, the secondary sprocket 42, the stopper 14, the engaging part 24, and the receiving part 44 of the first example embodiment, the variator 1A of the second example embodiment may include, for example, a sub chain 50, a primary sprocket 51, a secondary sprocket 52, and a one-way clutch 53, each of which will be described later.

The sub chain 50 may be, for example, a power transmission member such as a roller chain wrapped around the primary sprocket 51 and the secondary sprocket 52. In one embodiment, the sub chain 50 may serve as the "second power transmission member".

The primary sprocket 51 may be secured to the primary shaft 10.

The secondary sprocket 52 may be mounted on the secondary shaft 20 with the one-way clutch 53 located therebetween.

The primary sprocket 51 may be located adjacent to the primary pulley P1 at a position displaced in the axial direction. The secondary sprocket 52 may be located adjacent to the secondary pulley P2 at a position displaced in the axial direction.

In the example illustrated in FIG. 7, the primary sprocket 51 may be located on the primary shaft 10 adjacent to the movable sheave 12. The secondary sprocket 52 may be located on the secondary shaft 20 adjacent to the fixed sheave 21.

The one-way clutch 53 may be located between an inner circumferential surface of the secondary sprocket 52 and an outer circumferential surface of the secondary shaft 20.

The one-way clutch 53 may be engaged in accordance with a torque in a direction in which the secondary sprocket 52 drives the secondary shaft 20.

When the one-way clutch 53 is engaged, the secondary sprocket 52 may rotate together with the secondary shaft 20 to drive the secondary shaft 20.

When the one-way clutch 53 is released or disengaged, the secondary sprocket 52 may rotate freely, or may be idle, with respect to the secondary shaft 20.

In one embodiment, the one-way clutch 53 may serve as the "power transmission switch".

When the reduction ratio of the primary sprocket 51 and the secondary sprocket 52 (the number of teeth of the secondary sprocket 52/the number of teeth of the primary sprocket 51) is set to, for example, 2.0, the state of the one-way clutch 53 corresponding to the shifting ratio (reduction ratio) of the variator 1A may change as given in Table 1.

Note that the reduction ratio of the primary sprocket 51 and the secondary sprocket 52 may be set to be greater than or equal to the maximum reduction ratio that the variator 1A may take during normal traveling of the vehicle.

TABLE 1

Rotating speed of primary shaft: 1000 rpm
Reduction ratio of sprockets: 2.00

| Shifting ratio of variator | Rotating speed (rpm) of secondary pulley | Rotating speed (rpm) of secondary sprocket | State of one-way clutch |
|---|---|---|---|
| 2.00 | 500 | 500 | Drive (engaged) |
| 1.00 | 1000 | 500 | Idle (released) |
| 0.50 | 2000 | 500 | Idle (released) |

For example, when the rotating speed of the primary shaft 10 is constant at 1000 rpm, the rotating speed of the secondary sprocket 52 may be constant at 500 rpm.

In contrast, the rotating speed of the secondary pulley P2 may change in accordance with the shifting ratio corresponding to an effective diameter ratio between the primary pulley P1 and the secondary pulley P2. The rotating speed of the secondary pulley P2 may be equal to the rotating speed of the secondary shaft 20.

When the shifting ratio is less than 2.0, the rotating speed of the secondary pulley P2 may exceed the rotating speed of the secondary sprocket 52, and the one-way clutch 53 may be idle.

When the shifting ratio becomes 2.0, the rotating speed of the secondary pulley P2 may match with the rotating speed of the secondary sprocket 52. This may cause the one-way clutch 53 to be engaged, and thus the secondary sprocket 52 may start driving the secondary shaft 20.

According to the second example embodiment described above, it is possible to further achieve at least one of the following example effects in addition to example effects that are similar to the example effects of the first example embodiment described above except the example effects described in (2) and (3).

(1) The sub chain 50 may be located at a position displaced in the axial direction with respect to the primary pulley P1 and the secondary pulley P2. This makes it possible to apply an embodiment of the disclosure without greatly changing designs of the existing primary pulley P1 and the existing secondary pulley P2.

(2) The one-way clutch 53 may be used as the power transmission switch. This makes it possible to achieve desired operations with a simple configuration.

Modification Examples

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

(1) The shape, configuration, material, manufacturing method, the number of members, the position, etc. of each member configuring the continuously variable transmission are not limited to those in each of the above example embodiments and may be modified as appropriate.

(2) In each of the example embodiments, the first power transmission member may be, for example, a chain. However, an embodiment of the disclosure is not limited thereto and may be applicable to a belt continuously variable transmission.

(3) The reduction ratio of the primary sprocket and the secondary sprocket in the second example embodiment is an example and is modifiable as appropriate.

(4) In each of the example embodiments, the power transmission switch may be mounted on the secondary shaft. In some embodiments, the power transmission switch may be provided on the primary shaft.

The invention claimed is:

1. A continuously variable transmission comprising:
a primary shaft;
a secondary shaft disposed parallel to the primary shaft;
a primary pulley disposed on the primary shaft;
a secondary pulley disposed on the secondary shaft;
a first power transmission member having a loop shape and wrapped around the primary pulley and the secondary pulley;
a primary sprocket disposed on the primary shaft;
a secondary sprocket disposed on the secondary shaft;
a second power transmission member having a loop shape and wrapped around the primary sprocket and the secondary sprocket; and
a power transmission switch configured to:
disable power transmission by the second power transmission member when the first power transmission member is in a normal condition; and activate, from a non-active state, the power transmission by the second power transmission member when the first power transmission member is in an abnormal condition.

2. The continuously variable transmission according to claim 1, wherein the second power transmission member is disposed on an inner circumferential side of the first power transmission member.

3. The continuously variable transmission according to claim 1, wherein each of the primary pulley and the secondary pulley includes a pair of sheaves configured to selectively approach and separate from each other in an axial direction of the primary shaft and an axial direction of the secondary shaft, and wherein the power transmission switch is configured to activate the power transmission by the second power transmission member in response to an event in which a distance between the sheaves of one or both of the primary pulley and the secondary pulley falls within a range that is taken when the first power transmission member drops off the primary pulley and the secondary pulley.

4. The continuously variable transmission according to claim 2, wherein each of the primary pulley and the secondary pulley includes a pair of sheaves configured to selectively approach and separate from each other in an axial direction of the primary shaft and an axial direction of the secondary shaft, and wherein the power transmission switch is configured to activate the power transmission by the second power transmission member in response to an event in which a distance between the sheaves of one or both of the primary pulley and the secondary pulley falls within a range that is taken when the first power transmission member drops off the primary pulley and the secondary pulley.

5. The continuously variable transmission according to claim 1, wherein the second power transmission member is disposed at a position displaced in an axial direction of the primary shaft and an axial direction of the secondary shaft from the primary pulley and the secondary pulley.

6. The continuously variable transmission according to claim 1, wherein the primary sprocket and the secondary sprocket have a reduction ratio of greater than or equal to a maximum reduction ratio of the primary pulley and the secondary pulley when power is transmitted by the first power transmission member, and wherein the power transmission switch includes a one-way clutch that is configured to transmit power from the primary shaft to the secondary shaft and block the power transmission from the secondary shaft to the primary shaft.

7. The continuously variable transmission according to claim 2, wherein the primary sprocket and the secondary sprocket have a reduction ratio of greater than or equal to a maximum reduction ratio of the primary pulley and the secondary pulley when power is transmitted by the first power transmission member, and wherein the power transmission switch includes a one-way clutch that is configured to transmit power from the primary shaft to the secondary shaft and block the power transmission from the secondary shaft to the primary shaft.

8. The continuously variable transmission according to claim 3, wherein the primary sprocket and the secondary sprocket have a reduction ratio of greater than or equal to a maximum reduction ratio of the primary pulley and the secondary pulley when power is transmitted by the first power transmission member, and wherein the power transmission switch includes a one-way clutch that is configured to transmit power from the primary shaft to the secondary shaft and block the power transmission from the secondary shaft to the primary shaft.

9. The continuously variable transmission according to claim 4, wherein the primary sprocket and the secondary sprocket have a reduction ratio of greater than or equal to a maximum reduction ratio of the primary pulley and the secondary pulley when power is transmitted by the first power transmission member, and wherein the power transmission switch includes a one-way clutch that is configured to transmit power from the primary shaft to the secondary shaft and block the power transmission from the secondary shaft to the primary shaft.

10. The continuously variable transmission according to claim 5, wherein the primary sprocket and the secondary sprocket have a reduction ratio of greater than or equal to a maximum reduction ratio of the primary pulley and the secondary pulley when power is transmitted by the first power transmission member, and wherein the power transmission switch includes a one-way clutch that is configured to transmit power from the primary shaft to the secondary shaft and block the power transmission from the secondary shaft to the primary shaft.

11. The continuously variable transmission according to claim 1, wherein the first power transmission member includes:

pins disposed in a circumferential direction of the first power transmission member; and plates each coupling adjacent pins of the pins, and wherein the first power transmission member is bendable around each pin of the pins such that the first power transmission member deforms by a curvature corresponding to an effective diameter of each pulley.

12. The continuously variable transmission according to claim 1, wherein the primary sprocket is located radially outward of the primary shaft, and wherein the secondary sprocket is located radially outward of the secondary shaft.

13. The continuously variable transmission according to claim 1, wherein the abnormal condition is detected based on rotating speeds of the primary shaft and the secondary shaft.

14. The continuously variable transmission according to claim 1, wherein each of the primary pulley and the secondary pulley includes a pair of sheaves configured to selectively approach and separate from each other in an axial direction of the primary shaft and an axial direction of the secondary shaft, and wherein, when the first power transmission member is in the abnormal condition, the sheave spacing of the secondary pulley is changed.

15. The continuously variable transmission according to claim 1, wherein, when the first power transmission member is in the abnormal condition, the secondary sprocket does not rotate relative to the secondary shaft.

16. The continuously variable transmission according to claim 14, wherein, when the first power transmission member is in the abnormal condition, the secondary sprocket does not rotate relative to the secondary shaft.

17. A continuously variable transmission comprising:
a primary shaft;

a secondary shaft disposed parallel to the primary shaft;
a primary pulley disposed on the primary shaft;
a secondary pulley disposed on the secondary shaft;
a first power transmission member having a loop shape and wrapped around the primary pulley and the secondary pulley;
a primary sprocket disposed on the primary shaft;
a secondary sprocket disposed on the secondary shaft;
a second power transmission member having a loop shape and wrapped around the primary sprocket and the secondary sprocket; and
a power transmission switch configured to:
  disable power transmission by the second power transmission member when the first power transmission member is in a normal condition; and
  enable the power transmission by the second power transmission member when the first power transmission member is in an abnormal condition,
wherein the second power transmission member is disposed on an inner circumferential side of the first power transmission member.

\* \* \* \* \*